(12) United States Patent
Hou et al.

(10) Patent No.: US 12,417,366 B2
(45) Date of Patent: *Sep. 16, 2025

(54) CONTROL METHOD FOR AN ELECTRONIC PRICE TAG AND AN ELECTRONIC PRICE TAG SYSTEM

(71) Applicant: Hanshow Technology CO., LTD., Jiaxing (CN)

(72) Inventors: Shiguo Hou, Jiaxing (CN); Jianguo Zhao, Jiaxing (CN); Yang Zhao, Jiaxing (CN); Qi Jiang, Jiaxing (CN); Yujing Wang, Jiaxing (CN); Min Liang, Jiaxing (CN); Yaping Ji, Jiaxing (CN)

(73) Assignee: Hanshow Technology CO., LTD., Jiaxing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,132

(22) Filed: May 14, 2024

(65) Prior Publication Data
US 2024/0296306 A1   Sep. 5, 2024

Related U.S. Application Data

(63) Continuation of application No. 18/365,171, filed on Aug. 3, 2023, now Pat. No. 12,020,101.

(30) Foreign Application Priority Data

Aug. 3, 2022 (CN) .......................... 202210924191.5

(51) Int. Cl.
G06K 19/07 (2006.01)
G06K 19/06 (2006.01)
G08C 17/02 (2006.01)

(52) U.S. Cl.
CPC ......... G06K 19/0724 (2013.01); G08C 17/02 (2013.01); *G06K 2019/06253* (2013.01)

(58) Field of Classification Search
CPC ..... G06K 19/0724; G06K 2019/06253; G08C 17/02
See application file for complete search history.

(56) References Cited

U.S. PATENT DOCUMENTS 5,751,257 A * 5/1998 Sutherland .............. G06F 3/147
235/383
12,020,101 B2 * 6/2024 Hou .................... G06K 19/0724
(Continued)

FOREIGN PATENT DOCUMENTS

JP   2014180469 A   9/2014

*Primary Examiner* — Thomas D Alunkal
(74) *Attorney, Agent, or Firm* — Bayramoglu Law Offices LLC

(57) ABSTRACT

Disclosed are a control method for electronic price tags, an electronic price tag and an electronic price tag system. The control method comprises: receiving at least one first service instruction by a wireless communication module, and receiving at least one second service instruction by a short-distance communication module; and performing, by a fusion processing module, fusion processing on the at least one first service instruction and the at least one second service instruction, which are of a same service type and have an effective duration overlap therebetween, to enable a response module to respond synchronously according to control parameters obtained after fusion processing.

20 Claims, 6 Drawing Sheets

(56) References Cited

U.S. PATENT DOCUMENTS

| | | | | |
|---|---|---|---|---|
| 2004/0035927 | A1* | 2/2004 | Neumark | G06Q 10/087 |
| | | | | 235/385 |
| 2012/0326849 | A1* | 12/2012 | Relihan | G07G 1/145 |
| | | | | 340/10.6 |
| 2013/0278425 | A1* | 10/2013 | Cunningham | G08B 13/246 |
| | | | | 340/572.1 |
| 2020/0387382 | A1* | 12/2020 | Tseng | G06F 9/30185 |
| 2021/0304422 | A1* | 9/2021 | Yu | G06T 5/77 |

* cited by examiner

CONTROL METHOD FOR AN ELECTRONIC PRICE TAG AND AN ELECTRONIC PRICE TAG SYSTEM

CROSS REFERENCE TO THE RELATED APPLICATIONS

This application is the continuation application of U.S. application Ser. No. 18/365,171 filed on Aug. 3, 2023; U.S. application Ser. No. 18/365,171 is based upon and claims priority to Chinese Patent Application No. 202210924191.5, filed on Aug. 3, 2022, the entire contents of which are incorporated herein by reference.

BACKGROUND OF THE INVENTION

1. Technical Field

The invention relates to the technical field of communication of electronic price tags, in particular to a control method for electronic price tags, an electronic price tag, and an electronic price tag system.

2. Description of Related Art

Display components of electronic tags generally comprise a display screen and an indicator light, wherein the display screen is used for displaying information including, but not limited to, commodity information and operation prompt information related to commodities, which can be stored in a tag memory in multiple pages. For example, the basic information of commodities (such as the name, price, origin and promotion information of commodities) is in a default page, and display information for store management such as inventory information, shelf life of commodities, and whether commodities are about to reach the shelf life or have been beyond the shelf life is in other pages; and the indicator light flashes to remind working staff or customers of the position of commodities or to prompt the working staff or customers that a certain operation needs to be performed on commodities to which the tags are bound, such as placing a promotion sign for commodities or tags, sorting commodities, supplementing commodities, checking commodities about to reach the shelf life, or removing commodities beyond the shelf life from shelves. In addition, system parameters, such as the frame listening cycle and the heartbeat cycle, of electronic price tags are configured through a system.

In the prior art, control of the display and flashing of electronic price tags and parameter configuration of the electronic price tags are realized generally by issuing instructions to the price tags by a server through a base station based on wireless communication, which is poor in real-time performance; in addition, flashing of the indicator light, information display of the display screen or system parameter configuration is controlled when the electronic price tags receive an independent service instruction; and when multiple service instructions for controlling the same electronic price tag are received, in order to prevent disordered responses of the electronic price tag, the previous instruction is often covered by the service instruction received later, or the electronic price tag sequentially responds to the multiple service instructions according to the priority of the instructions, which may cause the problem of delayed response of the electronic price tags to the multiple service instructions or failure to execute all the service instructions.

BRIEF SUMMARY OF THE INVENTION

In view of the defects of the prior art, the invention provides a control method for electronic price tags, an electronic price tag and an electronic price tag system to solve the problem of delayed response of electronic price tags to multiple service instructions or failure to execute all the service instructions in the prior art.

In a first aspect, the invention provides a control method for electronic price tags, which is used for electronic price tags in an electronic price tag system, wherein the electronic price tag system comprises a server, at least one base station, at least one electronic price tag and a mobile terminal, the electronic price tag comprises a wireless communication module, a short-distance communication module, a fusion processing module and a response module, and the control method for electronic price tags comprises: receiving, by the wireless communication module, at least one first service instruction sent by the server through the base station, and receiving, by the short-distance communication module, at least one second service instruction sent by the mobile terminal; performing, by the fusion processing module, fusion processing on the at least one first service instruction and the at least one second service instruction, which are of a same service type and have an effective duration overlap therebetween, to enable the response module to respond synchronously according to control parameters obtained after fusion processing; and storing, by the fusion processing module, first service data in the first service instruction in a storage unit of the short-distance communication module, to allow the mobile terminal to obtain the first service data through the short-distance communication module.

Optionally, each service instruction comprises a total effective duration during which the service instruction is effective, and the fusion processing module obtains the effective duration overlap between the at least one first service instruction and the at least one second service instruction according to an issue time of each service instruction and the total effective duration of each service instruction; wherein, the effective duration overlap is a time period during which the at least one first service instruction and the at least one second service instruction are both effective.

Optionally, the control method further comprises: storing, by the fusion processing module, second service data in the second service instruction in the storage unit of the wireless communication module, and uploading, by the wireless communication module, the second service data to the base station, to allow the base station to upload the second service data to the server.

Optionally, the service type of the first service instruction comprises a flashing service instruction, a parameter configuration instruction, a page switching instruction, or a data update instruction; or/and, the service type of the second service instruction comprises a flashing service instruction, a parameter configuration instruction, a page switching instruction, or a data update instruction.

Optionally, the wireless communication module comprises a private protocol, Bluetooth or/and ZigBee communication interface; or/and, the short-distance communication module comprises an NFC or/and RFID communication interface.

Optionally, when the first service instruction and the second service instruction are both flashing service instructions and the response module comprises a flashing unit, performing, by the fusion processing module, fusion processing on the at least one first service instruction and the at least one second service instruction, which are of a same service type and have an effective duration overlap therebetween, to enable the response module to respond synchronously according to control parameters obtained after fusion processing comprises: obtaining, by the fusion processing module, a current effective duration of each flashing service instruction according to an issue time and total effective duration of each flashing service instruction; determining, by the fusion processing module, whether flashing colors of the at least two flashing service instructions are the same; and when the fusion processing module determines that the flashing colors of the at least two flashing service instructions are the same, taking a maximum current effective duration of the at least two flashing service instructions as a current flashing duration, and controlling the flashing unit to flash according to the flashing color and the current flashing duration.

Optionally, the control method further comprises: when the fusion processing module determines that the flashing colors of the at least two flashing service instructions are different, obtaining a crossed flashing service period and a separate flashing service period according to the current effective duration of each flashing service instruction; and controlling, by the fusion processing module, the flashing unit to flash alternately according to the flashing colors of crossed service instructions within the crossed flashing service period, and to flash according to the flashing color of a separate service instruction within the separated flashing service period.

Optionally, when the at least two flashing service instructions comprise a first flashing service instruction and a second flashing service instruction, obtaining a crossed flashing service period and a separate flashing service period according to the current effective duration of each flashing service instruction comprises: obtaining a minimum flashing duration of a first flashing duration and a second flashing duration, and taking the minimum flashing duration as the crossed flashing service period; and obtaining the separate flashing service period, which starts from an end time of the crossed flashing service period and ends with an end time of a maximum flashing duration of the first flashing duration and the second flashing duration; wherein, the first flashing duration is the current effective duration of the first flashing service instruction, and the second flashing duration is the current effective duration of the second flashing service instruction.

Optionally, when the at least two flashing service instructions comprise a first flashing service instruction, a second flashing service instruction and a third flashing service instruction, and the flashing colors of two of the first flashing service instruction, the second flashing service instruction and the third flashing service instruction are the same, obtaining a crossed flashing service period and a separate flashing service period according to the current effective duration of each flashing service instruction comprises: taking a maximum flashing duration of the two flashing service instructions with the same flashing color as a target flashing duration; obtaining a minimum flashing duration of the target flashing duration and a third flashing duration, and taking the minimum flashing duration as the crossed flashing service period; and obtaining the separate flashing service period, which starts from an end time of the crossed flashing service period and ends with an end time of a maximum flashing duration of the target flashing duration and the third flashing duration; wherein, the third flashing duration is the corresponding current effective duration of the flashing service instruction other than the two flashing service instructions with the same flashing color.

Optionally, when the at least two flashing service instructions comprise a first flashing service instruction, a second flashing service instruction and a third flashing service instruction, and the flashing colors of the first flashing service instruction, the second flashing service instruction and the third flashing service instruction are different, obtaining a crossed flashing service period and a separate flashing service period according to the current effective duration of each flashing service instruction comprises: obtaining a minimum flashing duration, a median flashing duration and a maximum flashing duration of a first flashing duration, a second flashing duration and a third flashing duration; and taking the minimum flashing duration as a first crossed period, taking a difference between the median flashing duration and the minimum flashing duration as a second crossed period, and taking a difference between the maximum flashing duration and the median flashing duration as the separate flashing service period, wherein the crossed flashing service period comprises the first crossed period and the second crossed period, the second crossed period starts from an end time of the first crossed period, and the separate flashing service period starts from an end time of the second crossed period.

Optionally, when the at least two flashing service instructions comprise a first flashing service instruction, a second flashing service instruction and a third flashing service instruction, the flashing colors of the first flashing service instruction, the second flashing service instruction and the third flashing service instruction are different, and flashing durations of two of the first flashing service instruction, the second flashing service instruction and the third flashing service instruction are the same, obtaining a crossed flashing service period and a separate flashing service period according to the current effective duration of each flashing service instruction comprises: taking the flashing duration of the two flashing service instructions with the same flashing duration as a target flashing duration; obtaining a minimum flashing duration of the target flashing duration and a third flashing duration, and taking the minimum flashing duration as the crossed flashing service period; and obtaining the separate flashing service period, which starts from an end time of the crossed flashing service period and ends with an end time of a maximum flashing duration of the target flashing duration and the third flashing duration; wherein, the third flashing duration is the corresponding current effective duration of the flashing service instruction other than the two flashing service instructions with the same flashing duration.

Optionally, the control method further comprises: obtaining a light-off instruction through the wireless communication module or the short-distance communication module; changing, by the fusion processing module, a current remaining effective duration of a corresponding flashing service instruction into "end immediately" according to the light-off instruction; and performing fusion processing by the fusion processing module according to the current remaining effective duration of the currently executed flashing service instruction.

Optionally, when the first service instruction and the second service instruction are both parameter configuration instructions and the response module comprises a parameter configuration unit, performing, by the fusion processing module, fusion processing on the at least one first service instruction and the at least one second service instruction, which are of a same service type and have an effective duration overlap therebetween, to enable the response module to respond synchronously according to control parameters obtained after fusion processing comprises: determining, by the fusion processing module, whether configuration parameters in the at least two parameter configuration instructions are the same; when the configuration parameters in the at least two parameter configuration instructions are different, or the configuration parameters are the same and parameter values are also the same, controlling, by the fusion processing module, the parameter configuration unit to combine and respond to the first service instruction and the second service instruction; or when the configuration parameters in the at least two parameter configuration instructions are the same and the parameter values are different, controlling, by the fusion processing module, the parameter configuration unit to execute the second service instruction first, and then controlling the parameter configuration unit to execute the first service instruction after an effective duration of the second service instruction ends.

Optionally, when the electronic price tag further comprises a storage module and the response module comprises a display unit, the control method further comprises: receiving a multi-page display data instruction through the wireless communication module or the short-distance communication module; and analyzing, by the fusion processing module, the multi-page display data instruction to obtain a page number of each page, display data in each page, and a default display page, sending the display data in the default display page to the display unit for display, and storing the page number of each page and the display data in each page in the storage module.

Optionally, the control method further comprises: receiving a page switching instruction through the wireless communication module or the short-distance communication module; obtaining a target display page number by the fusion processing module according to the page switching instruction; and obtaining, by the fusion processing module, target display data from the storage module according to the target display page number, sending the target display data to the display unit for display.

Optionally, the control method further comprises: when an effective duration of the page switching instruction ends, controlling, by the fusion processing module, the display unit to return to the default display page to display data; and when a second page switching instruction is received before the effective duration of the page switching instruction ends, controlling, by the fusion processing module, the display unit to display data according to the second page switching instruction.

Optionally, the control method further comprises: receiving a data update instruction through the wireless communication module or the short-distance communication module; obtaining an update page and update data in the data update instruction by the fusion processing module; replacing the display data in a page, with the same page number as the update page, in the storage module with the update data to obtain updated display data; and controlling the display unit to display or not display the updated display data according to a current configuration mode.

In a second aspect, the invention provides an electronic price tag, which comprises a wireless communication module, a short-distance communication module, a fusion processing module and a response module; the wireless communication module is in communication connection with a base station, and is used for receiving at least one first service instruction sent by a server through the base station, wherein the server establishes a communication connection with the base station; the short-distance communication module is in communication connection with a mobile terminal within a target communication range, and is used for receiving at least one second service instruction sent by the mobile terminal; the fusion processing module is connected to the wireless communication module, the short-distance communication module and the response module, is used for performing fusion processing on the at least one first service instruction and the at least one second service instruction, which are of a same service type and have an effective duration overlap therebetween, to enable the response module to respond synchronously according to control parameters obtained after fusion processing, and is also used for storing first service data in the first service instruction in a storage unit in the short-distance communication module, to allow the mobile terminal to obtain the first service data through the short-distance communication module.

In a third aspect, the invention provides an electronic price tag system, comprising a server, at least one base station, at least one electronic price tag, and a mobile terminal.

Compared with the prior art, the invention has the following beneficial effects:

1. In the invention, service instructions can be received through the wireless communication module and the short-distance communication module of the electronic price tag, and the electronic price tag can be controlled in various ways, such that working staff in stores and customers can perform operations conveniently; and the response efficiency of the electronic price tag can be improved through the short-distance communication module.

2. In the invention, fusion processing is performed on multiple service instructions, which are of a same service type and have an effective duration overlap therebetween, received in different ways, to enable the response module to respond synchronously according to control parameters obtained after fusion processing, such that the problem of delayed response of the electronic price tags to the multiple service instructions or failure to execute all the service instructions is solved, the stability of the electronic price tag system is improved, and the working efficiency of working staff and the experience of customers are improved.

3. In the invention, the first service data in the first service instruction is stored in the storage unit of the short-distance communication module through the fusion processing module, such that the mobile terminal can obtain the first service data through the short-distance communication module; and service data obtained from the wireless communication module and the short-distance communication module can be shared, such that more extended functions are provided for working staff and customers, and operation is made easier.

DETAILED DESCRIPTION OF THE INVENTION

To gain a better understanding of the purposes, technical solutions and advantages of the embodiments of the application, the technical solutions in the embodiments of the application will be clearly and completely described below in conjunction with the drawings in the embodiments of the application. Obviously, the embodiments in the following description are merely illustrative ones, and are not all possible ones of the application. All other embodiments obtained by those ordinarily skilled in the art according to the following ones without creative labor also fall within the protection scope of the application.

Figure 1:
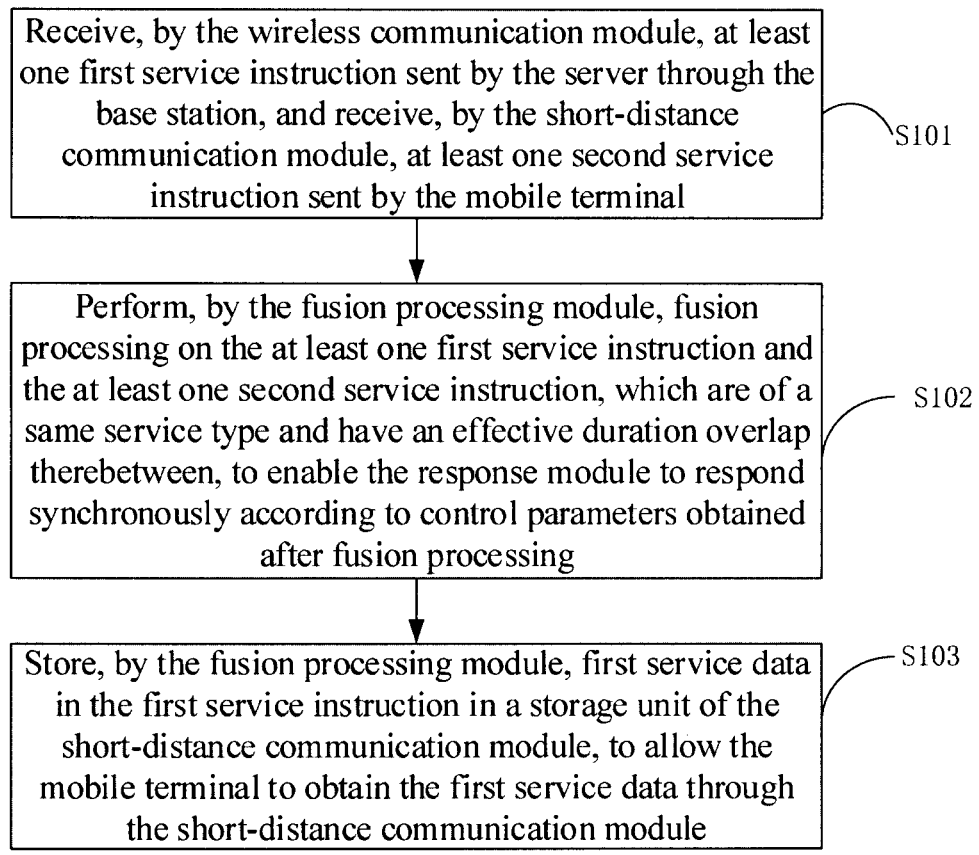
FIG. 1 illustrates a flow diagram of a control method for electronic price tags provided by one embodiment of the invention.

In a first aspect, the invention provides a control method for electronic price tags, which specifically comprises the following embodiments:

As shown in FIG. 1 which illustrates a flow diagram of a control method for electronic price tags provided by one embodiment of the invention, the control method for electronic price tags is used for electronic price tags in an electronic price tag system, the electronic price tag system comprises a server, at least one base station, a least one electronic price tag and a mobile terminal, and the electronic price tag comprises a wireless communication module, a short-distance communication module, a fusion processing module and a response module; the control method for electronic price tags specifically comprises the following steps:

S101: receiving, by the wireless communication module, at least one first service instruction sent by the server through the base station, and receiving, by the short-distance communication module, at least one second service instruction sent by the mobile terminal.

Figure 2:
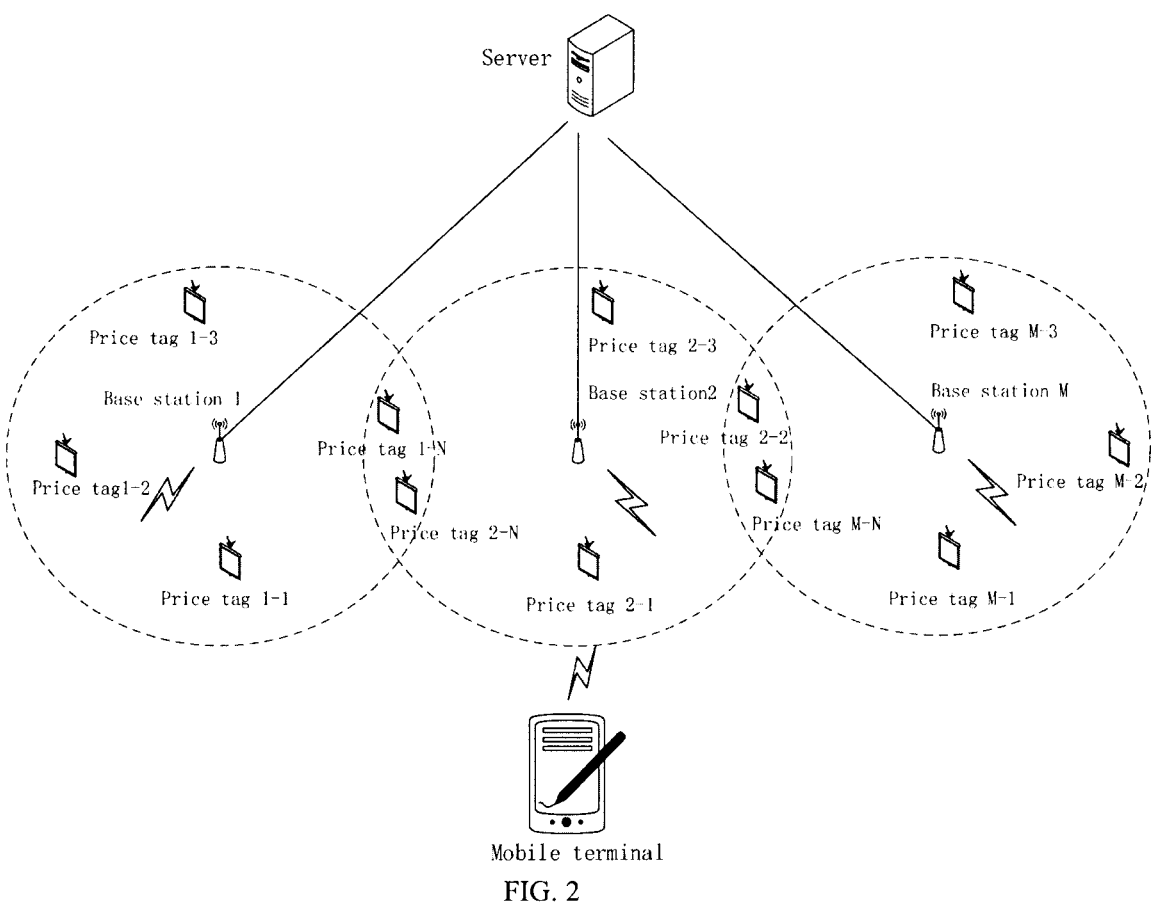
FIG. 2 illustrates a structural diagram of an electronic price tag system provided by one embodiment of the invention.

It should be noted that, as shown in FIG. 2, in this embodiment, the price tag system in each store comprises a server, multiple base stations, a plurality of electronic price tags and a mobile terminal, and the server sends trigger information or control instructions to the electronic price tags through the base stations, and the base stations regularly send synchronous signals and data signals comprising the trigger information or the control instructions.

In this embodiment, the electronic price tag establishes a communication connection with the base station through the wireless communication module, working staff or customers may send service instructions by calling an interface of the server, then the server sends the service instructions to the base station, and the base station sends the service instructions to the electronic price tag based on wireless communication, wherein a wireless communication protocol comprises, but is not limited to, a private protocol, Bluetooth, and ZigBee.

Optionally, working staff or customers may send service instructions to the server by means of the mobile terminal based on a wireless local area network protocol (such as WIFI), then the server sends the service instructions to the base station, and the base station sends the service instructions to the electronic price tag based on wireless communication.

In this embodiment, the electronic price tag establishes a communication connection with the mobile terminal through the short-distance communication module, working staff or customers may send service instructions to the electronic price tag by means of the mobile terminal based on short-distance communication, which includes, but is not limited to, NFC and RFID; wherein, the mobile terminal comprises, but is not limited to, a smartphone, a PAD and a handheld terminal.

The first service instruction comprises, but is not limited to, a flashing service instruction, a parameter configuration instruction, a page switching instruction or a data update instruction, and the second service instruction comprises, but is not limited to, a flashing service instruction, a parameter configuration instruction, a page switching instruction or a data update instruction. The wireless communication module comprises a private protocol or/and Bluetooth or/and ZigBee communication interface, and the short-distance communication module comprises an NFC or/and RFID communication interface.

S102: performing, by the fusion processing module, fusion processing on the at least one first service instruction and the at least one second service instruction, which are of a same service type and have an effective duration overlap therebetween, to enable the response module to respond synchronously according to control parameters obtained after fusion processing.

It should be noted that each service instruction comprises a total effective duration during which the service instruction is effective, the fusion processing module determines whether there is an effective duration overlap between the at least one first service instruction and the at least one second service instruction according to an issue time of each service instruction and the total effective duration of each service instruction, and when the at least one first service instruction and the at least one second service instruction are of a same service type and have an effective duration overlap therebetween, fusion processing is performed on the at least one first service instruction and the at least one second service instruction. Wherein, the effective duration overlap is a time period during which the at least one first service instruction and the at least one second service instruction are both effective.

Figure 3:
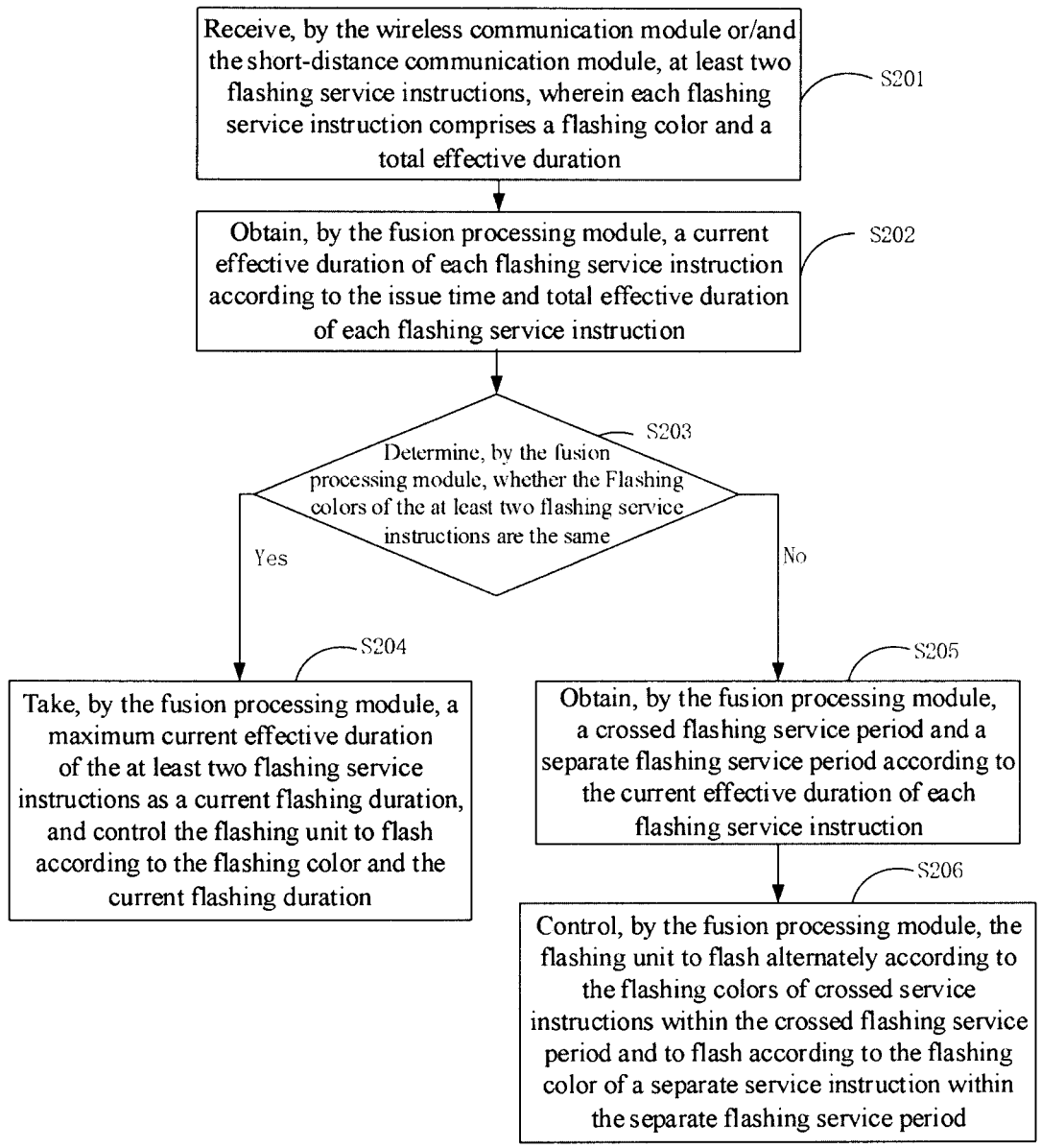
FIG. 3 illustrates a flow diagram of S102 in FIG. 1.

In this embodiment, as shown in FIG. 3, when the first service instruction and the second service instruction are both flashing service instructions and the response module comprises a flashing unit, performing, by the fusion processing module, fusion processing on the at least one first service instruction and the at least one second service instruction, which are of a same service type and have an effective duration overlap therebetween, to enable the response module to respond synchronously according to control parameters obtained after fusion processing specifically comprises the following steps:

S201: receiving, by the wireless communication module or/and the short-distance communication module, at least two flashing service instructions, wherein each flashing service instruction comprises a flashing color and a total effective duration.

In this embodiment, the current electronic price tag may synchronously receive multiple flashing service instructions sent by the server or/and the mobile terminal, each flashing service instruction comprises a flashing color and a total effective duration, the flashing color comprises, but is not limited to, green, red and yellow, and the total effective duration may be 30 s, 1 min, 5 min, or the like, wherein the flashing service instructions may be generated through a method in the prior art, which will not be detailed here.

S202: obtaining, by the fusion processing module, a current effective duration of each flashing service instruction according to the issue time and total effective duration of each flashing service instruction.

It should be noted that when the total effective duration of the first flashing service instruction is 3 min and the second flashing service instruction with the total effective duration of 4 min is received when the first flashing service instruction is executed for 1 min, the current effective duration of the first flashing service instruction is 2 min, and the current effective duration of the second flashing service instruction is 4 min; wherein, the current effective duration is calculated from the issue time of the last flashing service instruction received.

S203: determining, by the fusion processing module, whether the flashing colors of the at least two flashing service instructions are the same; when the fusion processing module determines that the flashing colors of the at least two flashing service instructions are the same, performing S204; or, when the fusion processing module determines that the flashing colors of the at least two flashing service instructions are different, performing S205.

In this embodiment, the fusion processing module is connected to the wireless communication module and the short-distance communication module, and is used for receiving flashing service instructions sent by the wireless communication module and the short-distance communication module and determining whether the flashing colors of the at least two flashing service instructions are the same.

S204: taking, by the fusion processing module, a maximum current effective duration of the at least two flashing service instructions as a current flashing duration, and controlling the flashing unit to flash according to the flashing color and the current flashing duration.

In this embodiment, when the flashing colors of the at least two flashing service instructions are the same, the fusion processing module sends out a control instruction to control the flashing unit to flash according to the flashing color of the at least two flashing service instructions, and the flashing duration is determined by the maximum current effective duration of the at least two flashing service instructions. For example, if the flashing color of a flashing service instruction 1 is green and the current effective duration of the flashing service instruction 1 is 1 min, the flashing color of a flashing service instruction 2 is green and the current effective duration of the flashing service instruction 2 is 3 min, and the flashing color of a flashing service instruction 3 is green and the current effective duration of the flashing service instruction 3 is 5 min, the fusion processing module controls the flashing unit of the current electronic price tag to flash green for 5 min, such that working staff or customers sending the flashing service instructions 1-3 can find the electronic price tag flashing green to perform commodity sorting, looking-for, supplementing or other operations.

In this embodiment, the flashing unit is connected to the fusion processing module and is used for flashing according to a control signal from the fusion processing module, wherein the flashing unit comprises an indicator light or/and a display screen.

S205: obtaining, by the fusion processing module, a crossed flashing service period and a separate flashing service period according to the current effective duration of each flashing service instruction.

In a first implementation of this embodiment, when the at least two flashing service instructions comprise a first flashing service instruction and a second flashing service instruction, obtaining a crossed flashing service period and a separate flashing service period according to the current effective duration of each flashing service instruction comprises: obtaining a minimum flashing duration of a first flashing duration and a second flashing duration, and taking the minimum flashing duration as the crossed flashing service period; and obtaining the separate flashing service period, which starts from an end time of the crossed flashing service period and ends with an end time of a maximum flashing duration of the first flashing duration and the second flashing duration; wherein, the first flashing duration is the current effective duration of the first flashing service instruction, and the second flashing duration is the current effective duration of the second flashing service instruction.

Figure 4:
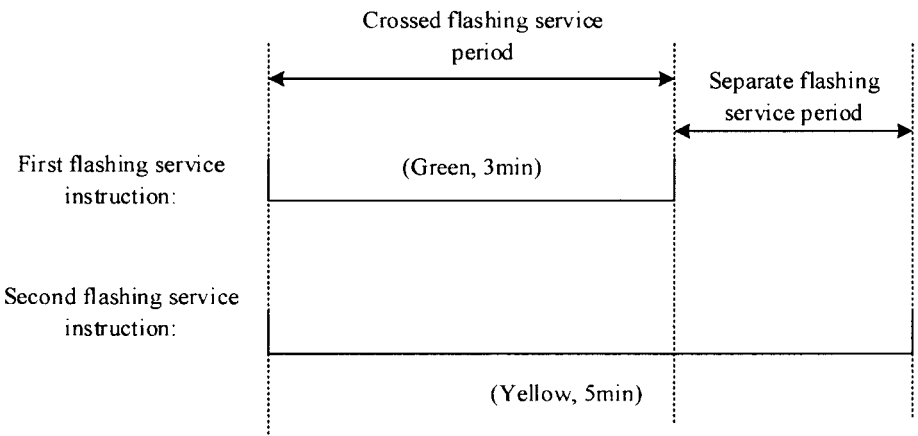
FIG. 4 illustrates a timing diagram of a first type of flashing service instructions provided by one embodiment of the invention.

It should be noted that the crossed flashing service period is a period including the at least two flashing service instructions, and the separate flashing service period is a period including one flashing service instruction; as shown in FIG. 4, when the flashing color of the first flashing service instruction is green, the current effective duration of the first flashing service instruction is 3 min, the flashing color of the second flashing service instruction is yellow and the current effective duration of the second flashing service instruction is 5 min, the crossed flashing service period is the minimum flashing duration of the at least two flashing service instructions, namely 3 min, the separate flashing service period starts from the end time of the crossed flashing service period and ends with the end time of the maximum flashing duration of the at least two flashing service instructions, and the total duration of the separate flashing service period is a difference between the first flashing duration and the second flashing duration.

In a second implementation of this embodiment, when the at least two flashing service instructions comprise a first flashing service instruction, a second flashing service instruction and a third flashing service instruction and the flashing colors of two of the first flashing service instruction, the second flashing service instruction and the third flashing service instruction are the same, obtaining a crossed flashing service period and a separate flashing service period according to the current effective duration of each flashing service instruction comprises: taking a maximum flashing duration of the two flashing service instructions with the same flashing color as a target flashing duration; obtaining a minimum flashing duration of the target flashing duration and a third flashing duration, and taking the minimum flashing duration as the crossed flashing service period; and obtaining the separate flashing service period, which starts from an end time of the crossed flashing service period and ends with an end time of a maximum flashing time of the target flashing duration and the third flashing duration; wherein, the third flashing duration is the corresponding current effective duration of the flashing service instruction other than the two flashing service instructions with the same flashing color, and the current effective duration is calculated from the issue time of the last flashing service instruction received.

Figure 5:
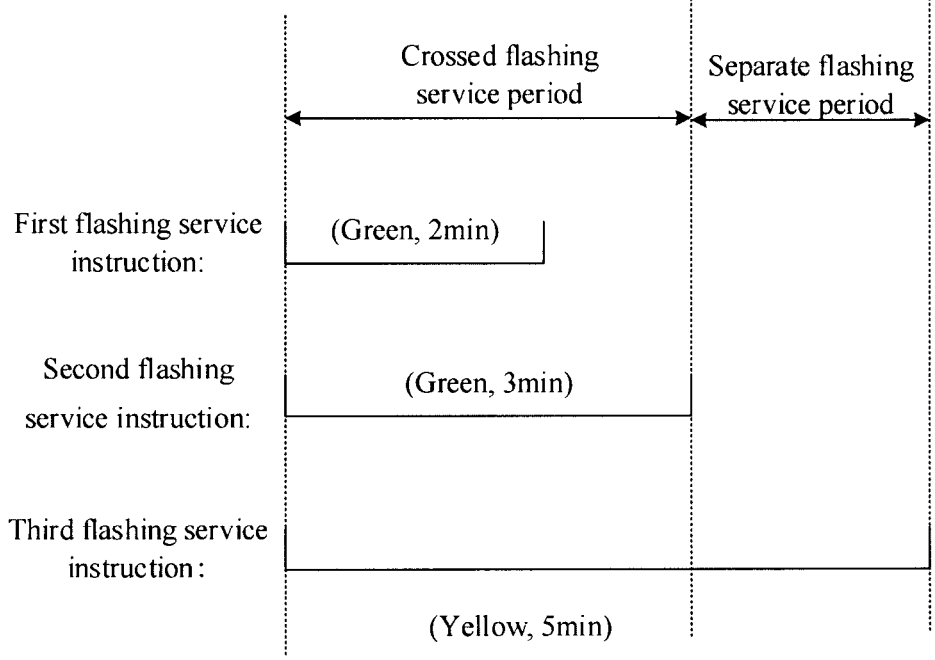
FIG. 5 illustrates a timing diagram of a second type of flashing service instructions provided by one embodiment of the invention.

It should be noted that, as shown in FIG. 5, in this embodiment, the at least two flashing service instructions comprise a first flashing service instruction, a second flashing service instruction and a third flashing service instruction, and the flashing colors of the first flashing service instruction and the second flashing service instruction are the same, for example, the flashing color of the first flashing service instruction is green, the current effective duration of the first flashing service instruction is 2 min, the flashing color of the second flashing service instruction is green, the current effective duration of the second flashing service instruction is 3 min, the flashing color of the third flashing service instruction is yellow and the current effective duration of the second flashing service instruction is 5 min; in this case, the flashing duration of the first flashing service instruction and the flashing duration of the second flashing service instruction with the same flashing color as the first flashing service instruction are fused, and the maximum flashing duration of the first flashing service instruction and the second flashing service instruction is used as a target flashing duration, which is 3 min in FIG. 4; then, the target flashing duration is compared with the flashing duration of the third flashing service instruction, and the smaller one of the target flashing duration and the flashing duration of the third flashing service instruction is taken as the crossed flashing service period, which is 3 min in FIG. 4; and the separate flashing service period corresponding to the third flashing service instruction is from the third minute to the fifth minute.

In a third implementation of this embodiment, when the at least two flashing service instructions comprise a first flashing service instruction, a second flashing service instruction and a third flashing service instruction and the flashing colors of the first flashing service instruction, the second flashing service instruction and the third flashing service instruction are different, obtaining a crossed flashing service period and a separate flashing service period according to the current effective duration of each flashing service instruction comprises: obtaining a minimum flashing duration, a median flashing duration and a maximum flashing duration of a first flashing duration, a second flashing duration and a third flashing duration; taking the minimum flashing duration as a first crossed period, taking a difference between the median flashing duration and the minimum flashing duration as a second crossed period, and taking a difference between the maximum flashing duration and the median flashing period as the separate flashing service period, wherein the crossed flashing service period comprises the first crossed period and the second crossed period.

Figure 6:
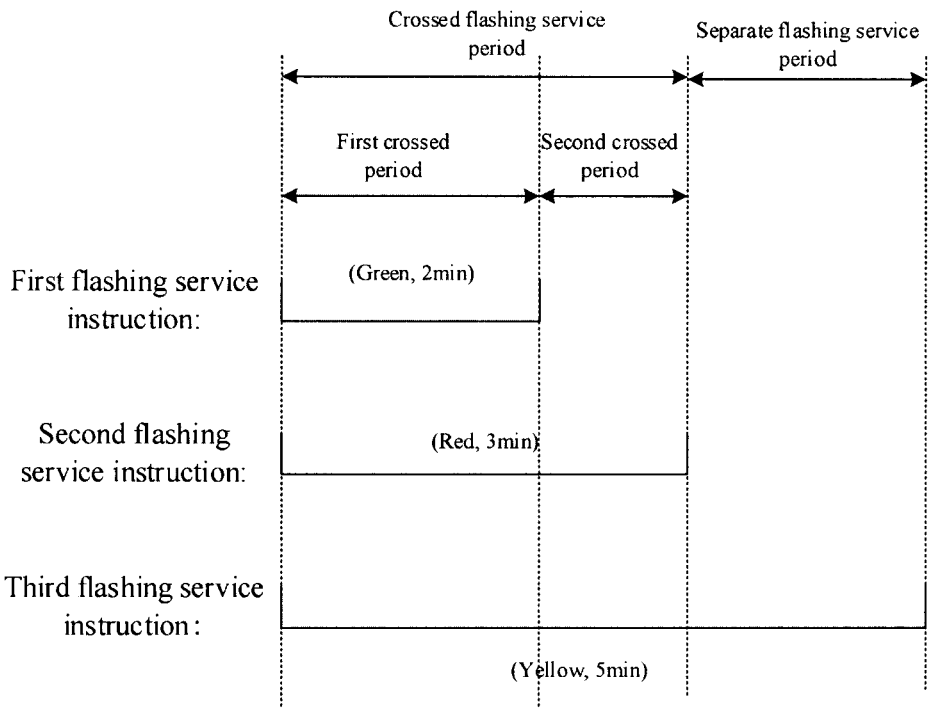
FIG. 6 illustrates a timing diagram of a third type of flashing service instructions provided by one embodiment of the invention.

It should be noted that, as shown in FIG. 6, in this embodiment, the at least two flashing service instructions comprise a first flashing service instruction, a second flashing service instruction and a third flashing service instruction, the flashing colors of the first flashing service instruction, the second flashing service instruction and the third flashing service instruction are different, and the flashing durations of the first flashing service instruction, the second flashing service instruction and the third flashing service instruction are also different; in this case, the minimum flashing duration is taken as a first crossed period, the difference between the median flashing duration and the minimum flashing duration is taken as a second crossed period, the difference between the maximum flashing duration and the median flashing period is taken as the separate flashing service period, the second crossed period starts from an end time of the first crossed period, and the separate flashing service period starts from an end time of the second crossed period.

In a fourth implementation of this embodiment, when the at least two flashing service instructions comprise a first flashing service instruction, a second flashing service instruction and a third flashing service instruction, the flashing colors of the first flashing service instruction, the second flashing service instruction and the third flashing service instruction are different, and the flashing durations of two of the first flashing service instruction, the second flashing service instruction and the third flashing service instruction are the same, obtaining a crossed flashing service period and a separate flashing service period according to the current effective duration of each flashing service instruction comprises: taking the flashing duration of the two flashing service instructions with the same flashing duration as a target flashing duration; obtaining a minimum flashing duration of the target flashing duration and a third flashing duration, and taking the minimum flashing duration as the crossed flashing service period; and obtaining the separate flashing service period, which starts from an end time of the crossed flashing service period and ends with an end time of a maximum flashing duration of the target flashing duration and the third flashing duration; wherein, the third flashing duration is the corresponding flashing duration of the flashing service instruction other than the two flashing service instructions with the same flashing duration.

Figure 7:
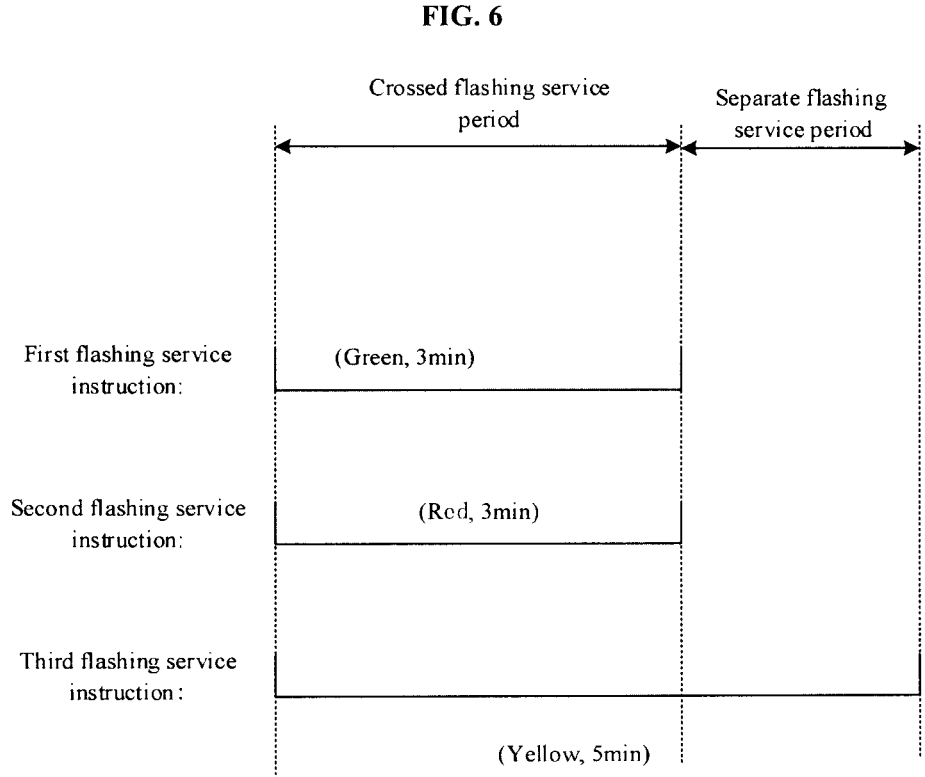
FIG. 7 illustrates a timing diagram of a fourth type of flashing service instructions provided by one embodiment of the invention.

It should be noted that, as shown in FIG. 7, in this embodiment, the flashing colors of three flashing service instructions are different and the flashing durations of two of the three flashing service instructions are the same, in this case, the flashing duration of the two flashing service instructions with the same flashing duration is compared with the corresponding current effective duration of the other flashing service instruction, the smaller one is taken as the crossed flashing service period, and the difference between the flashing duration of the two flashing service instructions with the same flashing duration and the corresponding current effective duration of the other flashing service instruction is taken as the separate flashing service period.

S206: controlling, by the fusion processing module, the flashing unit to flash alternately according to the flashing colors of crossed service instructions within the crossed flashing service period and to flash according to the flashing color of a separate service instruction within the separate flashing service period.

It should be noted that, the crossed service instructions are flashing service instructions which flash within the crossed flashing service period, and the separate service instruction is a flashing service instruction which flashes within the separate flashing service period. In FIG. 4, the flashing unit flashes green and yellow alternately for 3 min within the crossed flashing service period, and flashes yellow for 2 min within the separate flashing service period. In FIG. 5, the flashing unit flashes green and yellow alternately for 3 min within the crossed flashing service period, and flashes yellow for 2 min within the separate flashing service period. In FIG. 6, the flashing unit flashes green, red and yellow alternately for 2 min within the first crossed period, flashes red and yellow alternately for 1 min within the second crossed period, and flashes yellow for 2 min within the separate flashing service period. In FIG. 7, the flashing unit flashes green, red and yellow alternately for 3 min within the crossed flashing service period, and flashes yellow for 2 min within the separate flashing service period.

In this embodiment, fusion processing is performed on the flashing colors and flashing durations of multiple flashing service instructions received at the same time or at different times in different ways; when the flashing colors of the multiple flashing service instructions are different, the crossed flashing service period and the separate flashing service period are obtained according to the flashing durations of the flashing service instructions, and then the flashing unit is controlled to flash alternately according to the flashing colors of the crossed flashing service instructions within the crossed flashing service period, and to flash according to the flashing color of the separate flashing service instruction within the separate flashing service period. In this way, the problem that, in the prior art, when one electronic price tag is controlled by multiple flashing service instructions, the indicator light of the electronic price tag fails to flash is solved; and by performing fusion processing on multiple flashing service instructions sent to the electronic price tag, the indicator light of the electronic price tag can flashes to synchronously respond to multiple flashing service instructions, so the stability of the electronic price tag system is improved, and the working efficiency of working staff and the experience of customers are improved.

In another embodiment of the invention, when the first service instruction and the second service instruction are both parameter configuration instructions and the response module comprises a parameter configuration unit, performing, by the fusion processing module, fusion processing on the at least one first service instruction and the at least one second service instruction, which are of a same service type and have an effective durations overlap therebetween, to enable the response module to respond synchronously according to control parameters obtained after fusion processing comprises: determining, by the fusion processing module, whether configuration parameters in the at least two parameter configuration instructions are the same; when the configuration parameters in the at least two parameter configuration instructions are different, or the configuration parameters are the same and parameter values are also the same, controlling, by the fusion processing module, the parameter configuration unit to combine and respond to the first service instruction and the second service instruction; or, when the configuration parameters in the at least two parameter configuration instructions are the same and the parameter values are different, controlling, by the fusion processing module, the parameter configuration unit to execute the second service instruction first, and controlling the parameter configuration unit to execute the first service instruction when the effective duration of the second service instruction ends.

It should be noted that the server issues a parameter configuration instruction to the electronic price tag through the base station, and the mobile terminal sends a parameter configuration parameter to the electronic price tag based on short-distance communication, wherein the parameter is, for example, the frame listening cycle and the heartbeat cycle; the fusion processing module performs fusion processing on the parameter configuration instructions; if configuration parameters in the two parameter configuration instructions are different, the parameter configuration parameters are combined and then executed; if the configuration parameters in the two parameter configuration instructions same, the parameter configuration parameters are executed according to specified times. For example, the server issues a frame listening cycle to the price tag through the base station, the mobile terminal sends a heartbeat cycle to the price tag based on short-distance communication, and the parameters are combined by the fusion processing module and are then executed. For another example, the server issues a frame listening cycle to the price tag through the base station, the price tag performs frame listening according to the frame listening cycle, then the mobile terminal sends a frame listening cycle instruction with an effective duration of 4 hours to the price tag based on short-distance communication, the fusion processing module controls the price tag to perform frame listening according to a frame listening cycle received later, and controls the price tag to perform frame listening according to the previous frame listening cycle 4 hours later.

S103: storing, by the fusion processing module, first service data in the first service instruction in a storage unit of the short-distance communication module, to allow the mobile terminal to obtain the first service data through the short-distance communication module.

It should be noted that the server issues data and instructions to the price tag through the base station, the fusion processing module of the price tag sends the data and instructions, allowed to be obtained by the mobile terminal, to the short-distance communication module, and the data and instructions are stored in the storage unit of the short-distance communication module, such that working staff or customers can obtain the data and instructions, issued by the server, by means of the mobile terminal based on short-distance communication. For example, the server issues commodity information-associated data to the price tag bound to a commodity through the base station, the fusion processing module of the price tag transmits the commodity information-associated data, allowed to be obtained by the mobile terminal, to the short-distance communication module, the short-distance communication module stores the data in the storage unit, and customers can obtain the information associated with the commodity, to which the price tag is bound, from the short-distance communication module by means of the mobile terminal based on short-distance communication. The information may be, for example, an introduction of the commodity, or a web link of the introduction of the commodity.

In this embodiment, the control method for electronic price tags further comprises: storing, by the fusion processing module, second service data in the second service instruction in the storage unit of the wireless communication module, and uploading, by the wireless communication module, the second service data to the base station, to allow the base station to upload the second service data to the server.

Optionally, the mobile terminal issues data and instructions to the price tag based on short-distance communication; the fusion processing module of the price tag controls the wireless communication module to upload the data and instructions to the server, such that the server can synchronize the state and data of the price tag controlled by the mobile terminal; and a next behavior is triggered by the server, or the state of the current price tag is displayed by the server.

Compared with the prior art, this embodiment has the following beneficial effects:

1. In this embodiment, service instructions can be received through the wireless communication module and the short-distance communication module of the electronic price tag, and the electronic price tag can be controlled in various ways, such that working staff in stores and customers can perform operations conveniently; and the response efficiency of the electronic price tag can be improved through the short-distance communication module.

2. In this embodiment, fusion processing is performed on multiple service instructions, which are of a same service type and have an effective duration overlap therebetween, received in different ways, to enable the response module to respond synchronously according to control parameters obtained after fusion processing, such that the problem of delayed response of the electronic price tags to the multiple service instructions or failure to execute all the service instructions is solved, the stability of the electronic price tag system is improved, and the working efficiency of working staff and the experience of customers are improved.

3. In this embodiment, the first service data in the first service instruction is stored in the storage unit of the short-distance communication module through the fusion processing module, such that the mobile terminal can obtain the first service data through the short-distance communication module; and service data obtained from the wireless communication module and the short-distance communication module can be shared, such that more extended functions are provided for working staff and customers, and operation is made easier.

In another embodiment of the invention, when the electronic price tag further comprises a storage module and the response module comprises a display unit, the control method further comprises: receiving a multi-page display data instruction through the wireless communication module or the short-distance communication module; and analyzing, by the fusion processing module, the multi-page display data instruction to obtain a page number of each page, display data in each page and a default display page, sending the display data in the default display page to the display unit for display, and storing the page number of each page and the display data in each page in the storage module.

It should be noted that the mobile terminal issues an instruction through the server or the server directly issues an instruction, then the multi-page display data instruction is issued to the price tag through the base station or the mobile terminal sends the multi-page display data instruction to the price tag based on short-distance communication, the fusion processing module in the electronic price tag stores the display data in each page in the storage module and controls the display unit to display data in the default page according to the instruction, and the price tag records the page number of a currently displayed page and records the page number of the default page. Wherein, the basic information of commodities (such as the name, price, origin and promotion information of commodities) is in the default page, and display information for store management such as inventory information, shelf life of commodities, and whether commodities are about to reach the shelf life or have been beyond the shelf life is in other pages.

In another embodiment of the invention, the control method further comprises: receiving a page switching instruction through the wireless communication module or the short-distance communication module; obtaining, by the fusion processing module, a target display page number according to the page switching instruction; and obtaining, by the fusion processing module, target display data from the storage module according to the target display page number, and sending the target display data to the display unit for display.

Optionally, the control method further comprises: when the effective duration of the page switching instruction ends, controlling, by the fusion processing module, the display unit to display the default page; and when a second page switching instruction is received before the effective duration of the page switching instruction ends, controlling, by the fusion processing module, the display unit to display data according to the second page switching instruction.

It should be noted that, the mobile terminal issues a page switching instruction through the server or the server directly issues a page switching instruction, and then the page switching instruction is issued to the electronic price tag through the base station, or the mobile terminal issues the page switching instruction to the electronic price tag based on short-distance communication; the electronic price tag controls the display unit to display data in a target page according to the instruction, updates the page number of the currently displayed page to a new page number, and keeps recording the page number of the default page. When the effective duration of the page switching instruction ends, the electronic price tag controls the display unit to display the default page. When a second page switching instruction is received before the effective duration of the page switching instruction ends, the electronic price tag controls the display unit to display data according to the second page switching instruction.

In another embodiment of the invention, the control method further comprises: receiving a data update instruction through the wireless communication module or the short-distance communication module; obtaining, by the fusion processing module, an update page and update data in the data update instruction; replacing the display data in a page, with a same page number as the update page, in the storage module with the update data to obtain updated display data; and controlling the display unit to display or not display the updated display data according to a current configuration mode.

It should be noted that, the mobile terminal issues a data update instruction through the server or the server directly issues a data update instruction; then the data update instruction is issued to the electronic price tag through the base station; the electronic price tag updates update data in the data update instruction with data in a page, with the same page number, in the storage module; the electronic price tag determines whether the page number of an update page is the page number of the currently displayed page; if so, whether to display contents in the update page is determined according to a current configuration mode; if the current configuration mode is a page switching hold mode, the contents in the update page are not displayed; or, if the current configuration mode is a standard page switching mode, the contents in the update page are displayed. If the update page is different from the currently displayed page, the contents of the update page will not be displayed no matter whether the current configuration mode is the page switching hold mode or the standard page switching mode.

Figure 8:
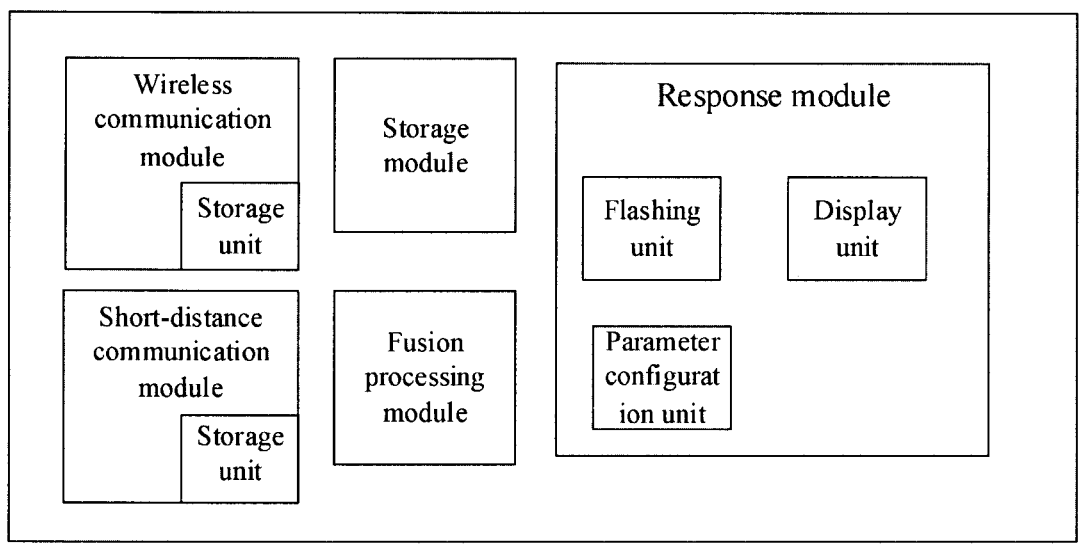
FIG. 8 illustrates a structural diagram of an electronic price tag provided by one embodiment of the invention.

In a second aspect, the invention provides an electronic price tag. As shown in FIG. 8, the electronic price tag comprises: a wireless communication module, a short-distance communication module, a fusion processing module and a response module;

The wireless communication module is in communication connection with the base station, and is used for receiving at least one first service instruction sent by a server through a base station, wherein the server establishes a communication connection with the base station;

The short-distance communication module establishes a communication connection with a mobile terminal within a target communication range, and is used for receiving at least one second service instruction sent by the mobile terminal;

The fusion processing module is connected to the wireless communication module, the short-distance communication module and the response module, is used for performing fusion processing on the at least one first service instruction and the at least one second service instruction, which are of a same service type and have an effective duration overlap therebetween, to enable the response module to respond synchronously according to control parameters obtained after fusion processing, and is also used for storing first service data in the first service instruction in a storage unit in the short-distance communication module, to allow the mobile terminal to obtain the first service data through the short-distance communication module.

Wherein, the response module comprises, but is not limited to, a flashing unit, a display unit and a parameter configuration unit.

In a third aspect, the invention provides an electronic price tag system, which comprises a server, at least one base station, at least one electronic price tag, and a mobile terminal.

Based on the electronic price tag system, the control method for electronic price tags has the following three implementations:

Implementation 1: customers send instructions by calling an interface of the server, wherein the instructions comprise, but are not limited to, binding price tags to commodities, updating display contents, flashing or lighting-off of price tags, page switching of price tags, and parameter configuration; then, the server sends the instructions to the base station; finally, the base station sends the instructions to the price tag based on wireless communication, wherein a wireless communication protocol comprises, but is not limited to, a private protocol, Bluetooth and ZigBee.

Implementation 2: working staff or customers send instructions to the server by means of the mobile terminal through a wireless local area network protocol (such as WIFI), and the base station sends the instructions to the price tag based on wireless communication.

Implementation 3: working staff or customers send instructions to the price tag by means of the mobile terminal based on short-distance communication, wherein the short-distance communication may be, but not limited to, NFC, RFID, and the like.

The electronic price tag system and the three implementations of the control method can be used in the following seven application scenarios:

Application Scenario 1

When working staff cannot find a commodity during commodity sorting, a flashing instruction is sent to the tag bound to the commodity according to Implementation 2, such that the working staff can be prompted to find the commodity quickly; in a case where multiple working staff sort commodities at the same time, multiple flashing instructions with different flashing colors may be issued, in order to save power of the tag, a light-off instruction corresponding to a specified flashing instruction is sent by means of the mobile terminal according to Implementation 3 after the working staff find the commodity, the corresponding flashing task of the tag will be ended, and the light-off instruction is reported to the server through the base station; and other flashing instructions of the tag within the effective duration are fused, and the flashing unit flashes according to the fusion result. Customers can monitor the state of the light of the tag in real time.

Application Scenario 2

When finding that commodities on a shelf are out of stock, working staff send a page switching instruction by means of the mobile terminal according to Implementation 3, and then the inventory is displayed; if the commodities are in stock, a commodity supplementing instruction is sent, and the working staff send another page switching instruction by means of the mobile terminal to enable the tag to return to the default page. When receiving the page switching instruction, the electronic price tag performs the page switching operation and then reports the current display page to the background server.

Application Scenario 3

When working staff sort commodities, a page switching instruction and a page switching hold time are issued according to Implementation 1, and the tag is switched to the default page after a fixed time (to ensure that the working staff can finish commodity sorting normally); or, permanent page switching is set (the tag will not automatically return to the default page), and the price tag is switched to the default page after the working staff finish commodity sorting); and when receiving a page switching instruction, the tag performs the page switching operation and reports the current display page to the server.

Application Scenario 4

When commodity information needs to be modified in a store, especially a store without network, working staff can directly modify the commodity information such as the commodity price directly in the store; after the commodity information is modified on the mobile terminal, the mobile terminal renders display contents and then sends display data to the tag according to Implementation 3; the tag updates the display contents; after the network resumes, the tag actively reports the modification to the server to replace the display contents to ensure that the display contents in the server are consistent with the actual display data of the tag and are used for generating display contents and data next times. This method is extremely beneficial for a case where display contents need to be modified without network. In a case where the network is available in the store, the method can be used to modify commodity information directly, and the tag reports the modification to the server in real time.

Application Scenario 5

Working staff can modify commodity information, such as the commodity price, directly in a store; after the commodity information is modified on the mobile terminal, the mobile terminal sends modified information to the tag according to Implementation 3, and the tag reports the modified information to the server through the base station; when receiving the modified information, the server regenerates display data in conjunction with original display contents, and issues to the regenerated display data to the tag through the base station; and the tag updates display contents according to the received display data. In this way, working staff can directly modify commodity information in a store by means of a handheld device without accessing the server, and acquire display data from the server through the tag, and working staff in stores can perform corresponding operations conveniently.

Application Scenario 6

The system issues a frame listening cycle of 16 s to the price tag according to Implementation 1, and the price tag sets its frame listening cycle to 16 s; in order to improve the real-time performance of services, working staff configures a frame listening cycle of 2 s for the price tag and sets the effective duration to 4 h; and the price tag changes its frame listening cycle to 2 s and performs frame listening according to the frame listening cycle of 2 s for 4 h, and then changes its frame listening cycle to 16 s again.

Application Scenario 7

The system issues commodity information (such as a web link of commodity introduction) to the price tag according to Implementation 1, and the price tag stores the commodity information in the short-distance communication module, such that working staff and customers can obtain the commodity information conveniently by means of the mobile terminal based on short-distance communication.

Those ordinarily skilled in the art can understand that all or part of the processes of the methods in the above embodiments can be implemented by relevant hardware instructed by a computer program, and the computer program may be stored in a nonvolatile computer-readable storage medium, and may implement the processes of the methods in the above embodiments when executed. Wherein, any citations of a memory, a storage unit, a database or other media used in the embodiments of the invention may include nonvolatile and/or volatile memories. The nonvolatile memories may include a read only memory (ROM), a programmable ROM (PROM), an electrically erasable ROM (EPROM), an electrically erasable programmable ROM (EEPROM), or a flash memory. The volatile memories may include a random access memory (RAM) or an external cache memory. For a purpose of description rather than restriction, the RAM may be in many forms such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), an Rambus direct RAM (RDRAM), a direct Rambus RAM (DRDRAM), and an Rambus dynamic RAM (RDRAM).

It should be noted that, in this specification, relational terms such as "first" and "second" are merely used for distinguishing one entity or operation from the other entity or operation, and does not require or imply that an actual relation or sequence exists between these entities or operations. In addition, the term "comprise" or "include" and any other variants refer to non-exclusive inclusion, so a process, method, article or device comprising a series of elements not only comprises these elements listed, but also comprises other elements not clearly listed, or inherent elements of the process, method, article or device. Unless otherwise expressly defined, an element defined by "comprise a" shall not exclusive of other identical elements in a process, method, article or device comprising said element.

What is claimed is:

1. An electronic price tag, comprising a wireless communication module, a short-distance communication module, a fusion processing module and a response module; wherein
    the wireless communication module is configured to receive at least one first service instruction sent by the server through a base station, and the short-distance communication module is configured to receive at least one second service instruction from a mobile terminal;
    the fusion processing module is configured to obtain an effective duration overlap between the at least one first service instruction and the at least one second service instruction according to an issue time of each service instruction and a total effective duration contained in each service instruction, and is further configured to perform fusion processing on the at least one first service instruction and the at least one second service instruction, which are of a same service type and have an effective duration overlap therebetween; and
    the response module is configured to respond synchronously according to control parameters obtained after fusion processing.

2. The electronic price tag according to claim 1, wherein the short-distance communication module comprises a storage unit, wherein the fusion processing module stores first service data in the first service instruction in the storage unit of the short-distance communication module; the wireless communication module comprises a storage unit, wherein the fusion processing module stores second service data in the second service instruction in the storage unit of the wireless communication module.

3. The electronic price tag according to claim 1, wherein service types of the first service instruction and the second service instruction are both flashing service instructions, each flashing service instruction comprises a flashing color and a total effective duration, and the response module comprises a flashing unit;
    the fusion processing module obtains a current effective duration of each flashing service instruction according to an issue time and total effective duration of each flashing service instruction; the fusion processing module determines whether flashing colors of at least two flashing service instructions are the same; and the fusion processing module sends a corresponding flashing control instruction to the flashing unit according to a determining result.

4. The electronic price tag according to claim 3, wherein when the fusion processing module determines that the flashing colors of the at least two flashing service instructions are the same, a maximum current effective duration of the at least two flashing service instructions is taken as a current flashing duration, and the flashing unit is controlled to flash according to the flashing color and the current flashing duration;
    when the fusion processing module determines that the flashing colors of the at least two flashing service instructions are different, a crossed flashing service period and a separate flashing service period are obtained according to the current effective duration of each flashing service instruction; and the flashing unit is controlled to flash alternately according to the flashing colors of crossed service instructions within the crossed flashing service period, and to flash according to the flashing color of a separate service instruction within the separated flashing service period.

5. The electronic price tag according to claim 4, wherein the at least two flashing service instructions comprise a first flashing service instruction and a second flashing service instruction; the fusion processing module obtains a minimum flashing duration of a first flashing duration and a second flashing duration, and takes the minimum flashing duration as the crossed flashing service period; and the separate flashing service period is obtained by starting from an end time of the crossed flashing service period and ending with an end time of a maximum flashing duration of the first flashing duration and the second flashing duration;
    wherein, the first flashing duration is the current effective duration of the first flashing service instruction, and the second flashing duration is the current effective duration of the second flashing service instruction.

6. The electronic price tag according to claim 4, wherein
    when the at least two flashing service instructions comprise a first flashing service instruction, a second flashing service instruction and a third flashing service instruction, and the flashing colors of two of the first flashing service instruction, the second flashing service instruction and the third flashing service instruction are the same, the fusion processing module obtains a maximum flashing duration of the two flashing service instructions with the same flashing color as a target flashing duration; a minimum flashing duration of the target flashing duration and a third flashing duration is obtained, and the minimum flashing duration is taken as the crossed flashing service period; the separate flashing service period is obtained by starting from an end time of the crossed flashing service period and ending with an end time of a maximum flashing duration of the target flashing duration and the third flashing duration; wherein, the third flashing duration is the corresponding current effective duration of the flashing service instruction other than the two flashing service instructions with the same flashing color; or the at least two flashing service instructions comprise the first flashing service instruction, the second flashing service instruction and a third flashing service instruction, the fusion processing module determines that the flashing colors of the first flashing service instruction, the second flashing service instruction and the third flashing service instruction are different, the fusion processing module obtains a minimum flashing duration, a median flashing duration and a maximum flashing duration of a first flashing duration, a second flashing duration and the third flashing duration; the minimum flashing duration is taken as a first crossed period, a difference between the median flashing duration and the minimum flashing duration of the first flashing duration, the second flashing duration and the third flashing duration is taken as a second crossed period, and a difference between the maximum flashing duration of the first flashing duration, the second flashing duration and the third flashing duration and the median flashing duration of the first flashing duration, the second flashing duration and the third flashing duration is taken as the separate flashing service period, wherein the crossed flashing service period comprises the first crossed period and the second crossed period, the second crossed period starts from an end time of the first crossed period, and the separate flashing service period starts from an end time of the second crossed period; or wherein when the at least two flashing service instructions comprise the first flashing service instruction, the second flashing service instruction and the third flashing service instruction, the flashing colors of the first flashing service instruction, the second flashing service instruction and the third flashing service instruction are different, and flashing durations of two of the first flashing service instruction, the second flashing service instruction and the third flashing service instruction are the same, the fusion processing module takes the flashing duration of the two flashing service instructions with the same flashing duration as a target flashing duration; a minimum flashing duration of the target flashing duration and the third flashing duration is obtained, and the minimum flashing duration is taken as the crossed flashing service period; the separate flashing service period is obtained by starting from an end time of the crossed flashing service period and ending with an end time of the maximum flashing duration of the target flashing duration and the third flashing duration, wherein, the third flashing duration is the corresponding current effective duration of the flashing service instruction other than the two flashing service instructions with the same flashing duration.

7. The electronic price tag according to claim 3, wherein the wireless communication module or the short-distance communication module receives a light-off instruction; the fusion processing module is configured to change a current remaining effective duration of a corresponding flashing service instruction into "end immediately" according to the light-off instruction; and the fusion processing module performs fusion processing according to the current remaining effective duration of the currently executed flashing service instruction.

8. The electronic price tag according to claim 1, wherein service types of the first service instruction and the second service instruction are both parameter configuration instructions, and the response module comprises a parameter configuration unit;

the fusion processing module performs fusion processing on the at least one first service instruction and the at least one second service instruction, which are of the same service type and have the effective duration overlap therebetween, to enable the response module to respond synchronously according to control parameters obtained after fusion processing; the fusion processing module determines whether configuration parameters in the at least two parameter configuration instructions are the same; the fusion processing module controls the parameter configuration unit to combine and respond to the first service instruction and the second service instruction according to a determining result, wherein when the fusion processing module determines that the configuration parameters in the at least two parameter configuration instructions are different, or the configuration parameters are the same and parameter values are also the same, the fusion processing module controls the parameter configuration unit to combine and respond to the first service instruction and the second service instruction; and when the fusion processing module determines that the configuration parameters in the at least two parameter configuration instructions are the same and the parameter values are different, the fusion processing module controls the parameter configuration unit to execute the second service instruction first, and then controls the parameter configuration unit to execute the first service instruction after an effective duration of the second service instruction ends.

9. The electronic price tag according to claim 1, further comprising a storage module, wherein the response module comprises a display unit;

the wireless communication module or the short-distance communication module receives a multi-page display data instruction; and the fusion processing module analyzes the multi-page display data instruction to obtain a page number of each page, display data in each page, and a default display page, and the fusion processing module sends the display data in the default display page to the display unit for display and stores the page number of each page and the display data in each page in the storage module.

10. The electronic price tag according to claim 9, wherein the wireless communication module or the short-distance communication module receives a page switching instruction, the fusion processing module obtains a target display page number according to the page switching instruction; the fusion processing module obtains target display data from the storage module according to the target display page number, and the fusion processing module sends the target display data to the display unit for display; when an effective duration of the page switching instruction ends, the fusion processing module controls the display unit to return to display the default display page to display data; and when a second page switching instruction is received before the effective duration of the page switching instruction ends, the fusion processing module is further configured to control the display unit to display data according to the second page switching instruction; or wherein the wireless communication module or the short-distance communication module receives a data update instruction; the fusion processing module obtains an update page and update data in the data update instruction; and the fusion processing module replaces display data in a given page, with the same page number as the update page, in the storage module with the update data to obtain updated display data, and controls the display unit to display or not display the updated display data according to a current configuration mode.

11. A control method performed by at least one electronic price tag in an electronic price tag system, the electronic price tag system including a server, at least one base station, the at least one electronic price tag, and a mobile terminal, the control method comprising:

receiving, by the at least one electronic price tag, at least one first service instruction sent by the server through the at least one base station, and receiving, by the at least one electronic price tag, at least one second service instruction sent by the mobile terminal;

performing, by the at least one electronic price tag, fusion processing on the at least one first service instruction and the at least one second service instruction, which are of a same service type and have an effective duration overlap therebetween, to enable the at least one electronic price tag to respond synchronously according to control parameters obtained after the fusion processing; and storing, by the at least one electronic price tag, first service data of the first service instruction to allow the mobile terminal to obtain the first service data through the at least one electronic price tag.

12. A control method for an electronic price tag comprising:

receiving, by a first communication interface, at least one first service instruction from a server;

receiving, by a second communication interface, at least one second service instruction sent by a mobile terminal;

determining, by a hardware processor, an effective duration overlap between the at least one first service instruction and the at least one second service instruction based on an issuance time and a total effective duration of each service instruction; and performing, by the hardware processor, fusion processing on the at least one first service instruction and the at least one second service instruction, which are of a same service type and have an effective duration overlap therebetween, to enable the electronic price tag to respond synchronously according to control parameters obtained after fusion processing, wherein, the effective duration overlap is a time period during which the at least one first service instruction and the at least one second service instruction are both effective.

13. The control method for an electronic price tag according to claim 12, storing, by the hardware processor, first service data from the first service instruction in a memory of the second communication interface, wherein the stored first service data is accessible by the mobile terminal via the second communication interface; and storing, by the hardware processor, second service data from the second service instruction in a memory of the first communication interface, wherein the second service data is transmitted to the server via the first communication interface.

14. The control method for an electronic price tag according to claim 12, wherein the service type of the first service instruction and the second service instruction comprises a flashing service instruction, a parameter configuration instruction, a page switching instruction, or a data update instruction.

15. The control method for an electronic price tag according to claim 14, wherein when the first service instruction and the second service instruction are both flashing service instructions of at least two flashing service instructions, and the control method comprises:

obtaining, by the hardware processor, a current effective duration of each flashing service instruction according to an issue time and total effective duration of each flashing service instruction;

determining, by the hardware processor, whether flashing colors of the at least two flashing service instructions are the same; and wherein the control method further comprises:

when the hardware processor determines that the flashing colors of the at least two flashing service instructions are the same, taking a maximum current effective duration of the at least two flashing service instructions as a current flashing duration, and controlling a flash according to the flashing color and the current flashing duration; or when the hardware processor determines that the flashing colors of the at least two flashing service instructions are different, obtaining a crossed flashing service period and a separate flashing service period according to the current effective duration of each flashing service instruction; and controlling, by the hardware processor, the electronic price tag to flash alternately according to the flashing colors of crossed service instructions within the crossed flashing service period, and to flash according to a flashing color of a separate service instruction within the separated flashing service period.

16. The control method for an electronic price tag according to claim 15, wherein the hardware processor determines that the flashing colors of the at least two flashing service instructions are different, wherein a) when the at least two flashing service instructions comprise a first flashing service instruction and a second flashing service instruction, said obtaining the crossed flashing service period and the separate flashing service period according to the current effective duration of each flashing service instruction includes obtaining a first minimum flashing duration of a first flashing duration and a second flashing duration, and taking the first minimum flashing duration as the crossed flashing service period; and obtaining the separate flashing service period, which starts from an end time of the crossed flashing service period and ends with an end time of a maximum flashing duration of the first flashing duration and the second flashing duration;

wherein, the first flashing duration is the current effective duration of the first flashing service instruction, and the second flashing duration is the current effective duration of the second flashing service instruction; or
b) when the at least two flashing service instructions comprise the first flashing service instruction, the second flashing service instruction and a third flashing service instruction, and the flashing colors of two of the first flashing service instruction, the second flashing service instruction and the third flashing service instruction are the same, said obtaining the crossed flashing service period and the separate flashing service period according to the current effective duration of each flashing service instruction includes
taking a maximum flashing duration of the two flashing service instructions with the same flashing color as a first target flashing duration;
obtaining a second minimum flashing duration of the first target flashing duration and a third flashing duration, and taking the second minimum flashing duration as the crossed flashing service period; and
obtaining the separate flashing service period, which starts from an end time of the crossed flashing service period and ends with an end time of a maximum flashing duration of the first target flashing duration and the third flashing duration;
wherein, the third flashing duration is the corresponding current effective duration of the flashing service instruction other than the two flashing service instructions with the same flashing color; or
c) when the at least two flashing service instructions comprise the first flashing service instruction, the second flashing service instruction and the third flashing service instruction, and the flashing colors of the first flashing service instruction, the second flashing service instruction and the third flashing service instruction are different, said obtaining the crossed flashing service period and the separate flashing service period according to the current effective duration of each flashing service instruction includes
obtaining a third minimum flashing duration, a median flashing duration and a maximum flashing duration of a fourth flashing duration, a fifth flashing duration and a sixth flashing duration; and
taking the third minimum flashing duration as a first crossed period, taking a difference between the median flashing duration and the third minimum flashing duration as a second crossed period, and taking a difference between the maximum flashing duration of the fourth flashing duration, the fifth flashing duration and the sixth flashing duration and the median flashing duration as the separate flashing service period, wherein the crossed flashing service period comprises the first crossed period and the second crossed period, the second crossed period starts from an end time of the first crossed period, and the separate flashing service period starts from an end time of the second crossed period; or
d) when the at least two flashing service instructions comprise the first flashing service instruction, the second flashing service instruction and the third flashing service instruction, the flashing colors of the first flashing service instruction, the second flashing service instruction and the third flashing service instruction are different, and flashing durations of two of the first flashing service instruction, the second flashing service instruction and the third flashing service instruction are the same, said obtaining the crossed flashing service period and the separate flashing service period according to the current effective duration of each flashing service instruction includes
taking the flashing duration of the two flashing service instructions with the same flashing duration as a second target flashing duration;
obtaining a fourth minimum flashing duration of the second target flashing duration and a seventh flashing duration, and taking the fourth minimum flashing duration as the crossed flashing service period; and
obtaining the separate flashing service period, which starts from an end time of the crossed flashing service period and ends with an end time of a maximum flashing duration of the second target flashing duration and the seventh flashing duration;
wherein, the seventh flashing duration is the corresponding current effective duration of the flashing service instruction other than the two flashing service instructions with the same flashing duration.

17. The control method for an electronic price tag according to claim 15, wherein the control method further comprises:
obtaining a light-off instruction through the first communication interface or the second communication interface;
changing, by the hardware processor, a current remaining effective duration of a corresponding flashing service instruction into an end immediately instruction according to the light-off instruction; and
performing fusion processing by the hardware processor according to the current remaining effective duration of a currently executed flashing service instruction.

18. The control method for an electronic price tag according to claim 14, wherein when the first service instruction and the second service instruction are both parameter configuration instructions of at least two parameter configuration instructions, the control method further comprises:
determining, by the hardware processor, whether configuration parameters in the at least two parameter configuration instructions are the same;
wherein
when the configuration parameters in the at least two parameter configuration instructions are different, or the configuration parameters are the same and parameter values are also the same, controlling, by the hardware processor, the electronic price tag to combine and respond to the first service instruction and the second service instruction; or
when the configuration parameters in the at least two parameter configuration instructions are the same and the parameter values are different, controlling, by the hardware processor, execution of the second service instruction first, and then controlling the electronic price tag to execute the first service instruction after an effective duration of the second service instruction ends.

19. The control method for an electronic price tag according to claim 12, further comprising:

receiving a multi-page display data instruction through the first communication interface or the second communication interface; and analyzing, by the hardware processor, the multi-page display data instruction to obtain a page number of each page, display data in each page, and a default display page, sending display data in the default display page to the electronic price tag for display, and storing the page number of each page and the display data in each page in memories of the electronic price tag.

20. The control method for an electronic price tag according to claim 19, wherein the control method further comprises:

A) receiving a page switching instruction through the first communication interface or the second communication interface; obtaining a target display page number by the hardware processor according to the page switching instruction; and obtaining, by the hardware processor, target display data from the memories of the electronic price tag according to the target display page number, sending the target display data to the electronic price tag for display, wherein when an effective duration of the page switching instruction ends, controlling, by the hardware processor, the electronic price tag to return to display the default display page; and when a second page switching instruction is received before the effective duration of the page switching instruction ends, controlling, by the hardware processor, the electronic price tag to display data according to the second page switching instruction; or B) receiving a data update instruction through the first communication interface or the second communication interface; obtaining an update page and update data in the data update instruction by the hardware processor; and replacing display data in a given page, with the same page number as the update page, in the memories of the electronic price tag with the update data to obtain updated display data; and controlling the electronic price tag to display or not display the updated display data according to a current configuration mode.

* * * * *